(12) United States Patent
Gupta et al.

(10) Patent No.: US 11,176,057 B2
(45) Date of Patent: Nov. 16, 2021

(54) INTEGRATION OF APPLICATION INDICATED MINIMUM TIME TO CACHE FOR A TWO-TIERED CACHE MANAGEMENT MECHANISM

(71) Applicant: INTERNATIONAL BUSINESS MACHINES CORPORATION, Armonk, NY (US)

(72) Inventors: Lokesh Mohan Gupta, Tucson, AZ (US); Matthew G. Borlick, Tucson, AZ (US); Beth Ann Peterson, Tucson, AZ (US); Kyler A. Anderson, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/790,226

(22) Filed: Feb. 13, 2020

(65) Prior Publication Data
US 2021/0255964 A1 Aug. 19, 2021

(51) Int. Cl.
*G06F 12/123* (2016.01)
*G06F 12/0891* (2016.01)
*G06F 12/0893* (2016.01)

(52) U.S. Cl.
CPC ........ *G06F 12/123* (2013.01); *G06F 12/0891* (2013.01); *G06F 12/0893* (2013.01);
(Continued)

(58) Field of Classification Search
CPC .............. G06F 12/123; G06F 12/0891; G06F 12/0893; G06F 2212/225; G06F 2212/462; G06F 2212/305
See application file for complete search history.

(56) References Cited

U.S. PATENT DOCUMENTS 5,513,336 A * 4/1996 Vishlitzky ........... G06F 12/0862
711/113
8,423,715 B2 4/2013 Heil et al.
(Continued)

OTHER PUBLICATIONS

Design Guidelines for High-Performance SCM Hierarchies (Year: 2019).*
(Continued)

*Primary Examiner* — Ernest Unelus
*Assistant Examiner* — Sakhr A Aldaylam
(74) *Attorney, Agent, or Firm* — Konrad Raynes Davda & Victor LLP; Rabindranath Dutta

(57) ABSTRACT

An indication is received from a host application of a first minimum retention time in a cache comprising a first type of memory and a second type of memory for a first plurality of tracks, wherein the first minimum retention time is not indicated for a second plurality of tracks. Based on the first minimum retention time, a second minimum retention time is set for the first plurality of tracks for the first type of memory and a third minimum retention time is set for the first plurality of tracks for the second type of memory. A track of the first plurality of tracks is demoted from the first type of memory, in response to determining that the track is a least recently used (LRU) track in a LRU list of tracks in the first type of memory and the track has been in the first type of memory for a time that exceeds the second minimum retention time.

20 Claims, 16 Drawing Sheets

(52) U.S. Cl.
CPC .. *G06F 2212/225* (2013.01); *G06F 2212/305* (2013.01); *G06F 2212/462* (2013.01)

(56) References Cited

U.S. PATENT DOCUMENTS

| | | | |
|---|---|---|---|
| 8,533,393 | B1 | 9/2013 | Cote et al. |
| 9,390,116 | B1 | 7/2016 | Li et al. |
| 9,529,731 | B1 | 12/2016 | Wallace et al. |
| 9,946,657 | B1 | 4/2018 | Muthukkaruppan et al. |
| 10,067,883 | B2 | 9/2018 | Ash et al. |
| 10,270,879 | B1 | 4/2019 | Wallner et al. |
| 2008/0046655 | A1 | 2/2008 | Bhanoo et al. |
| 2009/0037660 | A1 | 2/2009 | Fairhurst |
| 2014/0067852 | A1 | 3/2014 | Wong et al. |
| 2014/0330817 | A1 | 11/2014 | Eleftheriou et al. |
| 2015/0039837 | A1 | 2/2015 | Quan et al. |
| 2016/0378601 | A1 | 12/2016 | Oukid et al. |
| 2017/0052898 | A1* | 2/2017 | Ash ............... G06F 12/0893 |
| 2018/0067660 | A1* | 3/2018 | Yamamoto ........... G06F 3/0641 |
| 2018/0300257 | A1 | 10/2018 | Ash et al. |
| 2019/0391923 | A1 | 12/2019 | Gupta et al. |
| 2019/0391930 | A1 | 12/2019 | Gupta et al. |
| 2019/0391931 | A1 | 12/2019 | Gupta et al. |
| 2019/0391932 | A1 | 12/2019 | Gupta et al. |
| 2019/0391933 | A1 | 12/2019 | Gupta et al. |

OTHER PUBLICATIONS

U.S. Appl. No. 16/790,310, filed Feb. 13, 2020.
U.S. Appl. No. 16/790,249, filed Feb. 13, 2020.
List of IBM Patents and Applications Treated and Related, dated Feb. 13, 2020, pp. 2.
M. GAUR, et al. "Bypass and Insertion Algorithms for Exclusive Last-Level Caches", Jun. 2011, ACM, ISCA 2011, pp. 31-92.
J. Hsieh, et al., "Double Circular Caching Scheme for DRAM/PRAM Hybrid Cache", Aug. 2012, IEEE, 2012 IEEE International Conference on Embedded and real-Time Computing Systems and Applications, pp. 469-472.
IEEE Search Results (Year: 2021) cited by Examiner in the notice of references (PTO-892) attached to the Notice of Allowance dated Jun. 30, 2021, p. 24, for U.S. Appl. No. 16/790,310.
Notice of Allowance dated Jun. 30, 2021, p. 24, for U.S. Appl. No. 16/790,310.
Office Action dated May 28, 2021, p. 18, for U.S. Appl. No. 16/790,249.
Response dated Aug. 30, 2021 p. 10, to Office Action dated May 28, 2021, p. 18, for U.S. Appl. No. 16/790,249.

\* cited by examiner

INTEGRATION OF APPLICATION INDICATED MINIMUM TIME TO CACHE FOR A TWO-TIERED CACHE MANAGEMENT MECHANISM

BACKGROUND

1. Field

Embodiments relate to the integration of application indicated minimum time to cache for a two-tiered cache management mechanism.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual-server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. In a least recently used (LRU) cache replacement policy, the least recently used items are discarded first.

A storage class memory (SCM) is non-volatile memory that provides access speeds much higher than solid state drives (SSD). SCM is much cheaper than DRAM, but has a latency of a few microseconds which is higher than the latency of DRAM, where the latency of DRAM is of the order of nanoseconds. However, the latency of SCM is much lower than the latency of SSDs, where the latency of SSDs is generally greater than 100 microseconds. SCM may be comprised of non-volatile memory NAND devices that may be referred to as Flash memory. SCM may be comprised of other types of devices besides NAND devices.

In situations where SCM uses Flash memory for non-volatile storage, SCM exhibits some of the same limitations as SSDs. Flash memory devices have less endurance than DRAM as there are a limited number of erase cycles for flash bit cells, far less so than for DRAM cells. Wear leveling techniques that distribute writes across multiple flash memory cells in the same or different devices may be used to avoid overuse of specific Flash memory cells. Additionally, garbage collection may be time consuming with Flash memory based devices. There are many pages in an erase block. Since writes to Flash memory is done in pages but reclaiming is done on erase blocks level, it may to fragmentation and hence garbage collection may become processor intensive over time for SCM. It should be noted that generally SCMs have less write endurance and slower access characteristics than DRAM, but while many SCMs use Flash memory, not all do.

Summary of the Preferred Embodiments

Provided are a method, system, and computer program product in which an indication is received from a host application of a first minimum retention time in a cache comprising a first type of memory and a second type of memory for a first plurality of tracks, wherein the first minimum retention time is not indicated for a second plurality of tracks. Based on the first minimum retention time, a second minimum retention time is set for the first plurality of tracks for the first type of memory and a third minimum retention time is set for the first plurality of tracks for the second type of memory. A track of the first plurality of tracks is demoted from the first type of memory, in response to determining that the track is a least recently used (LRU) track in a LRU list of tracks in the first type of memory and the track has been in the first type of memory for a time that exceeds the second minimum retention time.

In additional embodiments, the first type of memory is a dynamic random access memory (DRAM) cache and the second type of memory is a storage class memory (SCM) cache, wherein the second minimum retention time is a DRAM cache minimum retention time and the third minimum retention time is a SCM cache minimum retention time.

In additional embodiments, a cache management application demotes a track of the first plurality of tracks from the SCM cache, in response to determining that the track is a least recently used (LRU) track in a LRU list of tracks in the SCM cache and the track has been in the SCM cache for a time that exceeds the SCM cache minimum retention time.

In yet additional embodiments, the indication of the first minimum retention time in cache comprises an individual minimum retention time for the DRAM cache and an individual minimum retention time for the SCM cache, wherein the DRAM cache minimum retention time is set to the individual minimum retention time for the DRAM cache, and wherein the SCM cache minimum retention time is set to the individual minimum retention time for the SCM cache.

In further embodiments, the indication of the first minimum retention time in cache comprises an aggregate minimum retention time for the DRAM cache and the SCM cache, wherein the DRAM cache minimum retention time is set to a predetermined percentage of the aggregate minimum retention time, and wherein the SCM cache minimum retention time is set to a remaining percentage of the aggregate minimum retention time.

In yet further embodiments, while promoting a track securing more than a predetermined number of hits from the SCM cache to the DRAM cache, unless a new first minimum retention time is provided for the track by the host application, a cache management application sets the DRAM cache minimum retention time to a difference of the SCM cache minimum retention time and the time the track has spent in the SCM cache prior to being promoted to the DRAM cache.

In certain embodiments, promoting a track from the DRAM cache to SCM cache comprises adding an unutilized time for the track in the DRAM cache to the SCM cache minimum retention time. In further embodiments, the DRAM cache has a lower latency but a lower storage capacity than the SCM cache, wherein the DRAM cache and the SCM cache form a two-tier cache with the DRAM cache being a higher tier and the SCM cache being a lower tier, and wherein for the second plurality of tracks a cache management application does not set the DRAM cache minimum retention time and the SCM cache minimum retention time.

BRIEF DESCRIPTION OF THE DRAWINGS

Referring now to the drawings in which like reference numbers represent corresponding parts throughout.

DETAILED DESCRIPTION

Figure 1:
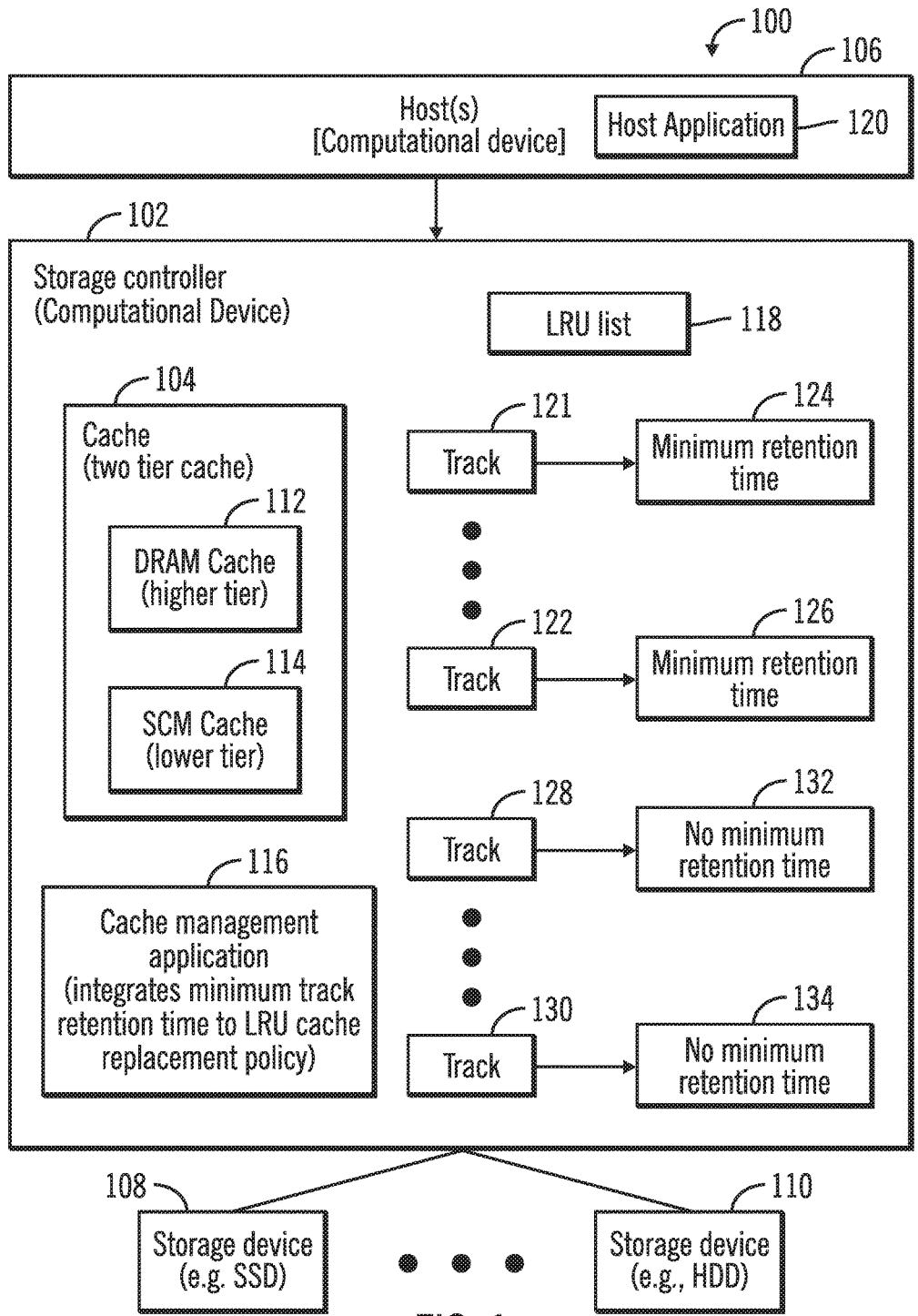
FIG. 1 illustrates a block diagram of a computing environment comprising a storage controller with a two-tier cache coupled to one or more hosts and one or more storage devices, in accordance with certain embodiments.

In the following description, reference is made to the accompanying drawings which form a part hereof and which illustrate several embodiments. It is understood that other embodiments may be utilized and structural and operational changes may be made.

A storage controller may include a two-tiered cache in which a first tier of the cache is a Dynamic Random Access Memory (DRAM) cache and a second tier of the cache is a storage class memory (SCM) cache. The storage capacity of the DRAM cache is a relatively smaller in comparison to the storage capacity of the SCM cache. However, the latency of the DRAM cache is relatively lower than the latency of the SCM cache. There is a need in the art for improved techniques for managing a two-tiered cache that includes DRAM and SCM.

In a conventional least recently used (LRU) based cache management mechanism of a storage controller, a cache management application may add a track to the most recently used (MRU) end of a least recently used (LRU) list of tracks. The cache management application demotes a track from the cache, in response to determining that the track is a least recently used (LRU) track in a LRU list of tracks.

Certain applications may provide indications (i.e., hints) to the cache management application of the minimum amount of time that a track should remain in the cache, where the application is aware that the track is likely to access the track once again within the minimum amount of time. The minimum amount of time is referred to as the minimum retention time. As a result, caching operations in a storage controller takes account of hints provided by an application to retain certain tracks in cache for at least a minimum amount of time before demoting the tracks. If the minimum retention time is not specified by the application then the conventional LRU based cache management mechanism is employed.

In a two-tiered cache, if minimum retention time is adhered to strictly for all applications, then the two-tiered cache may become full of tracks that have minimum retention time and no track can be demoted. Certain embodiments provide mechanisms to prevent such a situation from occurring in a two-tiered cache, while at the same time ensuring that minimum retention time requirements are adhered to.

In certain embodiments, an application specifies individual minimum retention times for the DRAM cache and the SCM cache, or just one overall minimum retention time for both the DRAM cache and the SCM cache. For example, in certain embodiments a database management application may indicate that indexes are to be kept in DRAM cache for 1 minute and in SCM cache for 2 minutes, or the database management application may just provide an overall minimum retention time indication to keep indexes for a minimum duration of 3 minutes in both the DRAM cache and SCM cache together (i.e., the indexes should be maintained for at least 3 minutes in aggregate in the DRAM cache and the SCM cache).

Certain embodiments provide mechanisms to keep tracks in DRAM cache for the minimum retention time indicated for the DRAM cache and in SCM cache for the minimum retention time indicated for the SCM cache, if both the DRAM minimum retention time and the SCM minimum retention time are indicated.

If only an overall minimum retention time is indicated for a track then certain embodiments retain tracks in the DRAM cache for 50% (or some other percentage) of overall minimum retention time in the DRAM cache. When demoting a track from the DRAM cache to SCM cache, the remaining minimum time for retention is computed, and the track is maintained in the SCM cache for the computed time. As a result, the DRAM cache which is smaller in size in comparison to the SCM cache is prevented from becoming fill while the overall minimum retention time indicated by an application is satisfied.

Certain embodiments provide improvements to computer technology, by integrating application indicated minimum retention time for tracks to LRU based track demoting schemes in a cache management system of a storage controller having a two-tier cache comprising a DRAM cache and a SCM cache. As a result, caching operations in a storage controller takes account of hints (i.e., indications) provided by an application to retain certain tracks in cache for at least a minimum amount of time. However, the cache is prevented from becoming full (i.e., tracks cannot be staged to the cache) when too many tracks have a minimum retention time. The cache is also prevented from becoming full when too high a percentage of tracks have a minimum retention time. A LRU list is augmented with the information on whether a track has a minimum retention time indicated by an application, and unless the cache is in danger of being full, such requests for minimum retention time is adhered to by the cache management application of the storage controller. As a result, the needs for minimum retention time for a subset of tracks is balanced with the demoting needs of the cache to prevent the cache from becoming full in a two-tier cache. Additionally, time for which a track is maintained in the DRAM cache and SCM cache may be adjusted during promotion of a track to the DRAM cache or to the SCM cache.

EXEMPLARY EMBODIMENTS

FIG. 1 illustrates a block diagram of a computing environment 100 comprising a storage controller 102 with a two-tier cache 104 coupled to one or more hosts 106 and one or more storage devices 108, 110, in accordance with certain embodiments.

The storage controller 102 allows the one or more hosts 106 to perform input/output (I/O) operations with logical storage maintained by the storage controller 102. The physical storage corresponding to the logical storage may be found in one or more of the storage devices 108, 110 and/or cache 104 (also referred to as a two-tier cache) of the storage controller 102.

The storage controller 102 and the hosts 106 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 106 may be elements in any suitable network, such as, a storage area network, a wide area network, the Internet, an intranet. In certain embodiments, storage controller 102 and the one or more hosts 106 may be elements in a cloud computing environment.

The two-tier cache 104 may be any suitable cache known in the art or developed in the future. In some embodiments, the two-tier cache 104 may be implemented with a volatile memory (such as the DRAM cache 112) and a non-volatile memory (such as the SCM cache 114). The two-tier cache 104 may store both modified and unmodified data, where a cache management application 116 may periodically demote (i.e., move) data from the SCM cache 114 to storage devices 108, 110 controlled by the storage controller 102. In certain embodiments, cache management application 116 may be implemented in software, firmware, hardware or any combination thereof.

The plurality of storage devices 108, 110 may be comprised of any storage devices known in the art. For example, the storage device 108 may be a solid state drive (SSD) and the storage device 110 may be a hard disk drive (HDD).

The DRAM cache 112 forms the higher tier of the two-tier cache 104, and the SCM cache 114 forms the lower tier of the two-tier cache. The DRAM cache 112 has a lower latency and a lower storage capacity than the SCM cache 114.

A LRU list 118 for each type of cache (e.g., one LRU list for the DRAM cache 112, and another LRU list for the SCM cache 114) is maintained in the storage controller 102 by the cache management application 115. The cache management application 116 receives indications from one or more host applications on whether tracks used by the host application 120 should be protected from demotion from the two-tier cache 104 for a time duration referred to as a minimum retention time. The minimum retention time may be provided in many different ways. For example, an aggregate minimum retention time may be provide for the DRAM cache 112 and the SCM cache 114, or individual minimum retention time may be provided for the DRAM cache 112 and the SCM cache 114. A plurality of tracks 121, 122 may have minimum retention times 124, 126 indicated by host applications. Another plurality of tracks 128, 130 may have no indications of minimum retention time (as shown via reference numerals 132, 134). The LRU list 118 may include some of the plurality of tracks 121, 122 and some of the plurality of tracks 128, 130, i.e., the LRU list 118 includes tracks in the two-tier cache 104 with minimum retention time and tracks in the two-tier cache 104 without minimum retention time. It should be noted that each track stored in any tier of cache is indicated in the corresponding LRU list 118, and the LRU list 118 is used by the cache management application 116 to determine which tracks to demote from the tiers of the two-tier cache 104.

In certain embodiments, the cache management application 116 demotes tracks from the two-tier cache 104 by taking into account the LRU list 118 which is augmented with the minimum retention time for tracks where such minimum retention times are available. An attempt is made by the cache management application 116 to satisfy the minimum retention time requirements to the extent possible, while at the same time preventing the two-tier cache 104 from becoming full.

Figure 2:
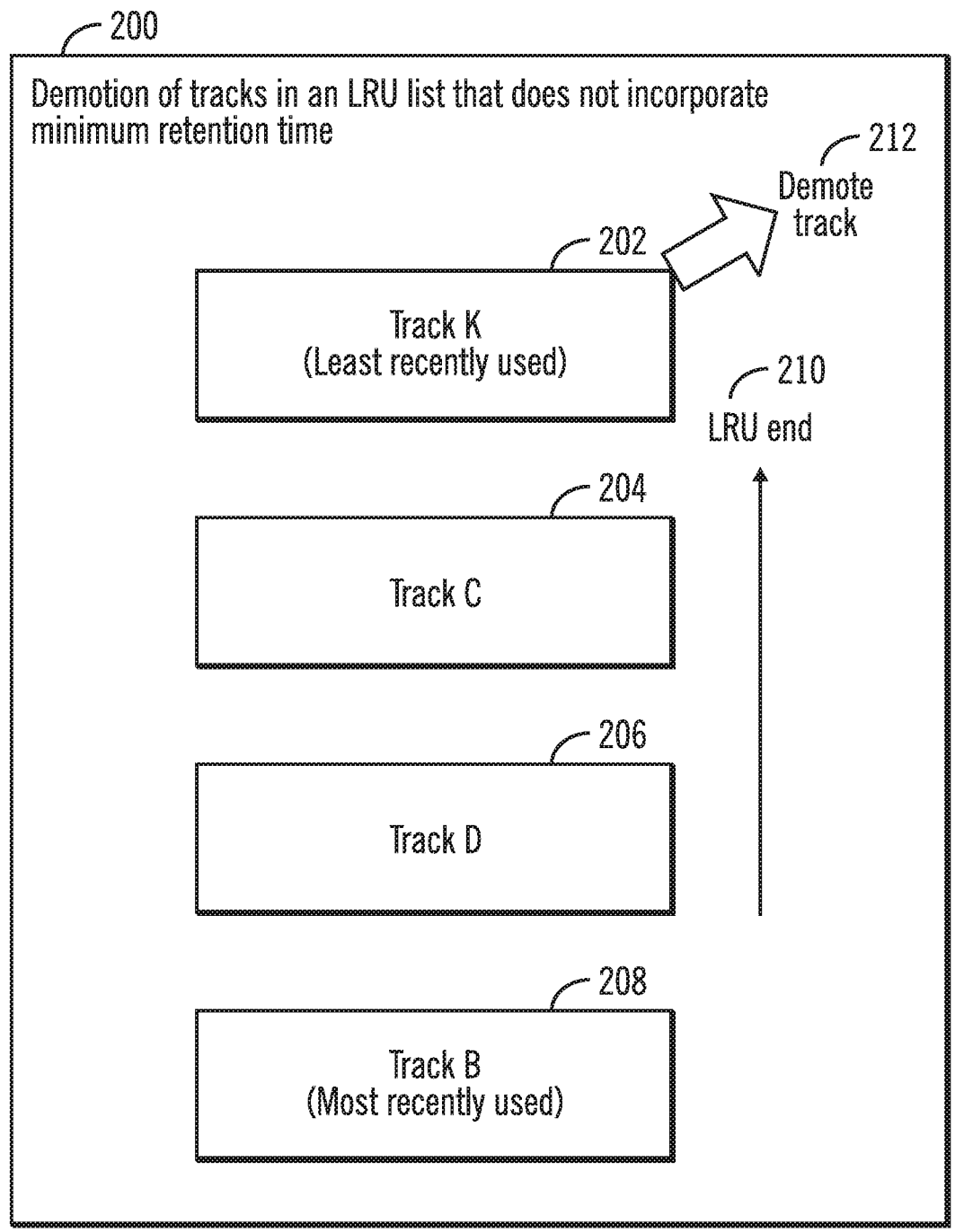
FIG. 2 illustrates a block diagram that shows demotion of tracks from an LRU list that does not incorporate a minimum retention time for selected tracks, in accordance with certain embodiments.

FIG. 2 illustrates a block diagram 200 that shows demotion of tracks from a LRU list that does not incorporate a minimum retention time for selected tracks, in accordance with certain embodiments.

For simplicity, only four tracks, denoted as track K 202, track C 204, track D 206, and track B 208 are shown in FIG. 2, although a typical LRU list may have thousands or tens of thousands of tracks.

The LRU end of the list is towards the top (as shown via reference numeral 210). As a result, track K 202 is the least recently used track, and track B 208 is the most recently used track.

Unless minimum retention time information was included with the tracks, track K 202 is demoted in a conventional LRU based cache replacement policy (as shown via reference numeral 212). However, if track K 202 is likely to seek entry to the cache shortly after demotion (for example in a situation where a host application 120 indicates that track K 202 should have a minimum retention time), then the cache hit ratio would be decreased.

Figure 3:
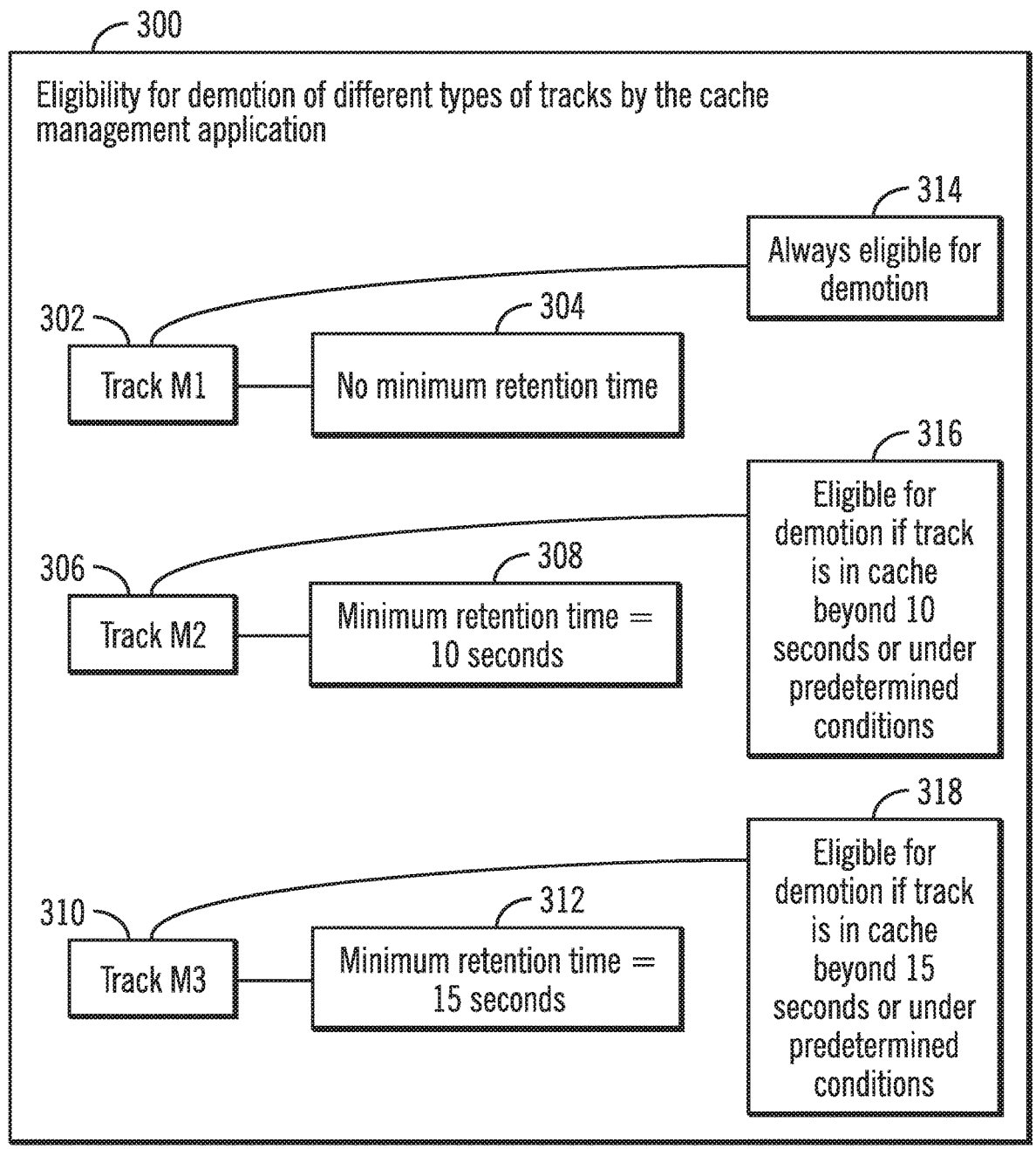
FIG. 3 illustrates a block diagram that shows the eligibility for demotion of different types of tracks, in accordance with certain embodiments.

FIG. 3 illustrates a block diagram 300 that shows the eligibility for demotion of different types of tracks in any tier of cache, in accordance with certain embodiments.

Track M1 302 has no minimum retention time 304 indicated by the host application 120. As a result, track M1 302 is always eligible for demotion when track M1 302 reaches the LRU end of the LRU list 118 (as shown via reference numeral 314).

Track M2 306 has a minimum retention time 308 of 10 seconds indicated by the host application 120. As a result, track M2 306 is eligible for demotion if track M2 306 is in cache beyond 10 seconds or under certain predetermined conditions when the cache 104 is in danger of getting full (as shown via reference numeral 316).

Track M3 310 has a minimum retention time 312 of 15 seconds indicated by the host application 120. As a result, track M3 310 is eligible for demotion if track M3 310 is in cache beyond 15 seconds or under certain predetermined conditions when the cache 104 is in danger of getting full (as shown via reference numeral 318).

Figure 4:
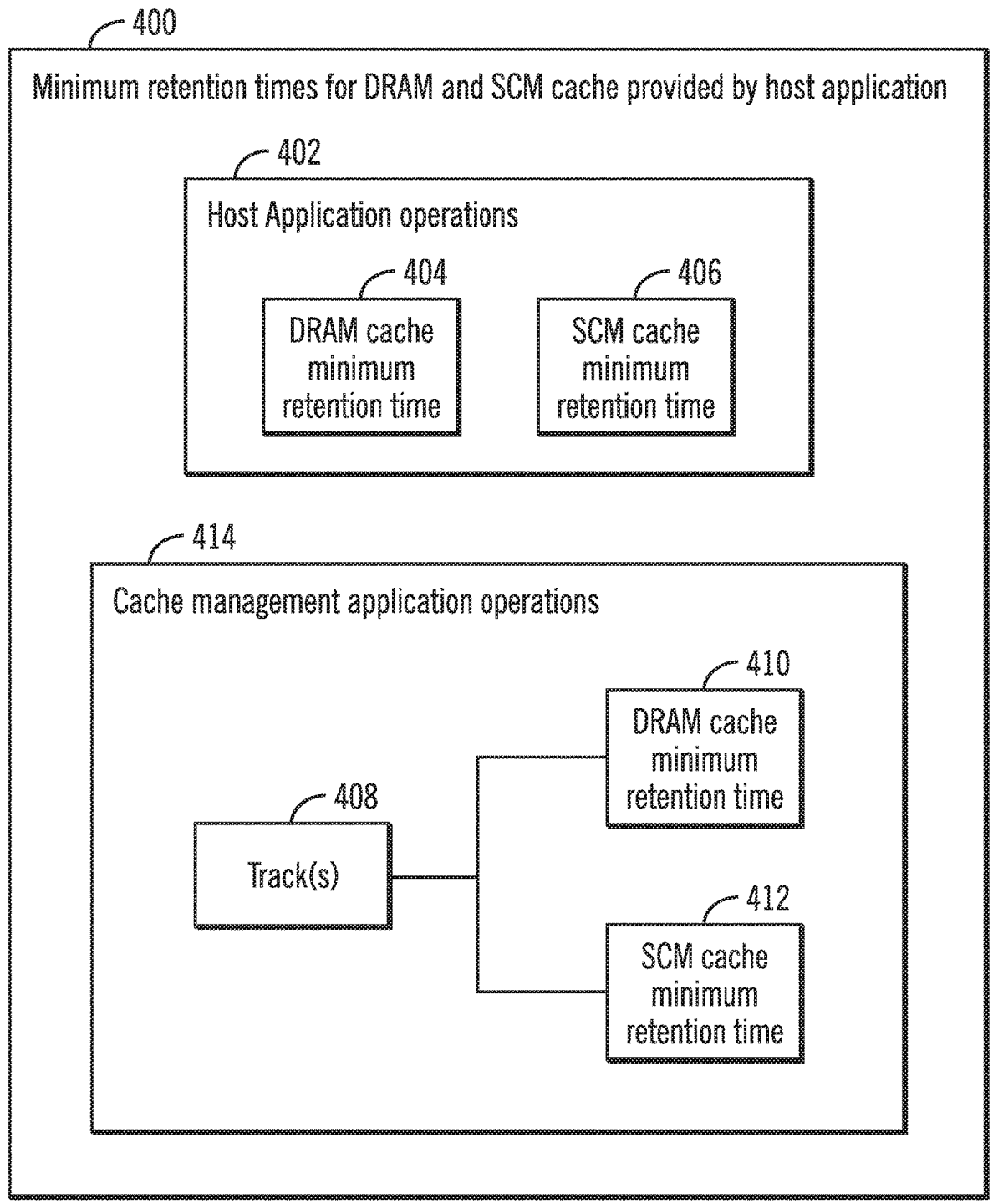
FIG. 4 illustrates a block diagram that shows operations performed when minimum retention times for DRAM cache and SCM cache are provided by a host application, in accordance with certain embodiments.

FIG. 4 illustrates a block diagram 400 that shows operations performed when minimum retention times for DRAM cache 112 and SCM cache 114 are provided by a host application 120, in accordance with certain embodiments.

The host application operations 402 include providing a DRAM cache minimum retention time 404 and a SCM cache minimum retention time 406 for tracks 408. The DRAM cache minimum retention time is the minimum time for which the host application 120 prefers to retain each of the tracks 408 in the DRAM cache 112, and the SCM cache minimum retention time is the minimum time for which the host application 120 prefers to retain each of the tracks 408 in the SCM cache 114.

The cache management application associates for the tracks 408 the DRAM cache minimum retention time 410 and the SCM cache minimum retention time 412 where these times are provided by the host application 120. The cache management operations are shown via reference numeral 414 in FIG. 4.

Figure 5:
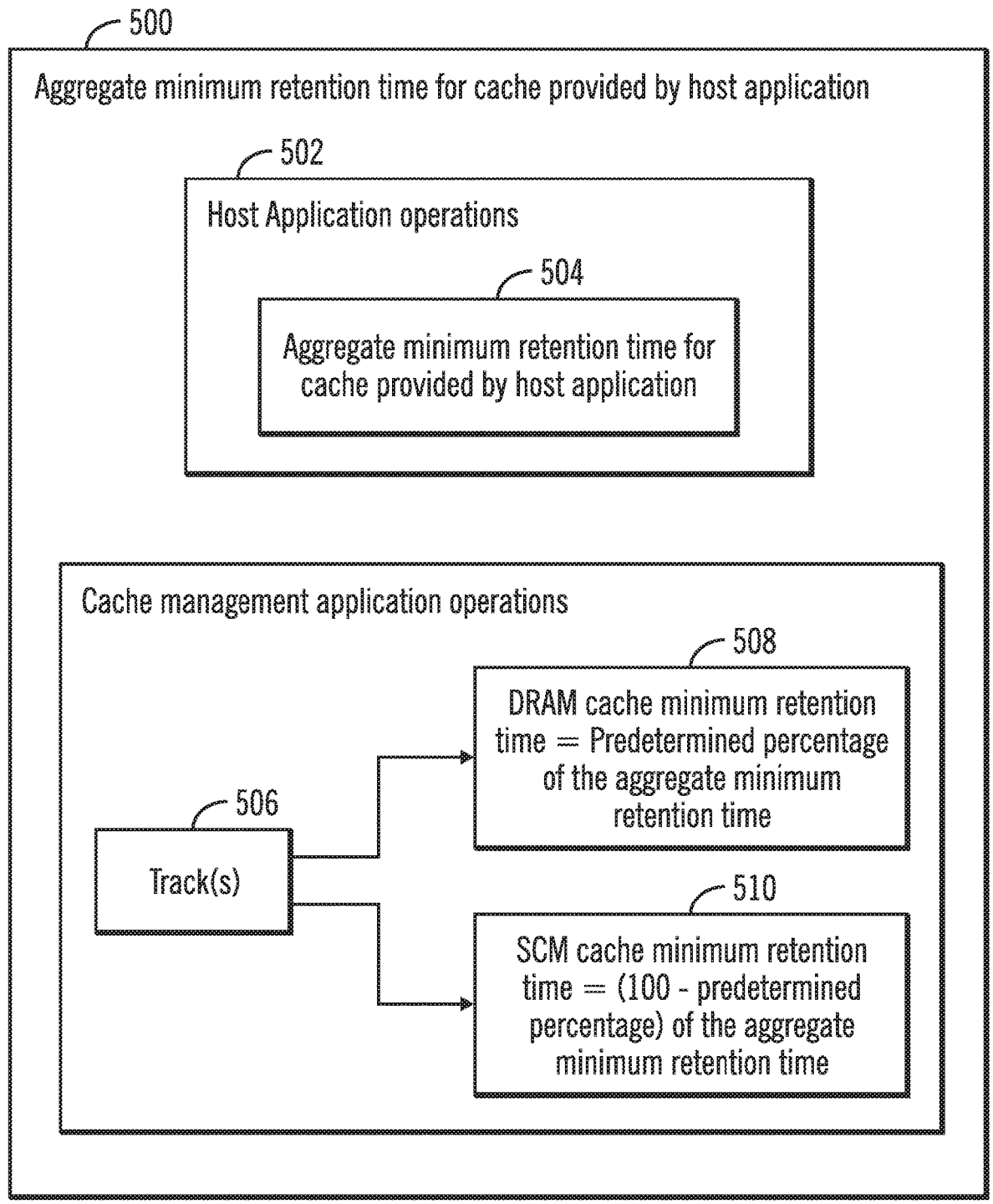
FIG. 5 illustrates a block diagram that shows operations performed when aggregate minimum retention time for cache is provided by a host application, in accordance with certain embodiments.

FIG. 5 illustrates a block diagram 500 that shows operations performed when aggregate minimum retention time for the two-tier cache 104 is provided by a host application 120, in accordance with certain embodiments.

The host application operations 502 include providing an aggregate minimum retention time 504 for the two-tier cache for a plurality of tracks 506. The aggregate minimum retention time 504 is the minimum time for which the host application 120 prefers to retain each of the tracks 506 in the two-tier cache 104.

The cache management application 116 computes for the tracks 506 the DRAM cache minimum retention time 508 which is a predetermined percentage (e.g., 50%) of the aggregate minimum retention time 504. The cache management application 116 computes for the tracks 506 the SCM cache minimum retention time 510 which is "100 minus the predetermined percentage" of the aggregate minimum retention time 504. For example, if the predetermined percentage is 40% and the aggregate minimum retention time is 100 seconds, then the DRAM cache minimum retention time is 40 seconds, and the SCM cache minimum retention time is 60 seconds.

Figure 6:
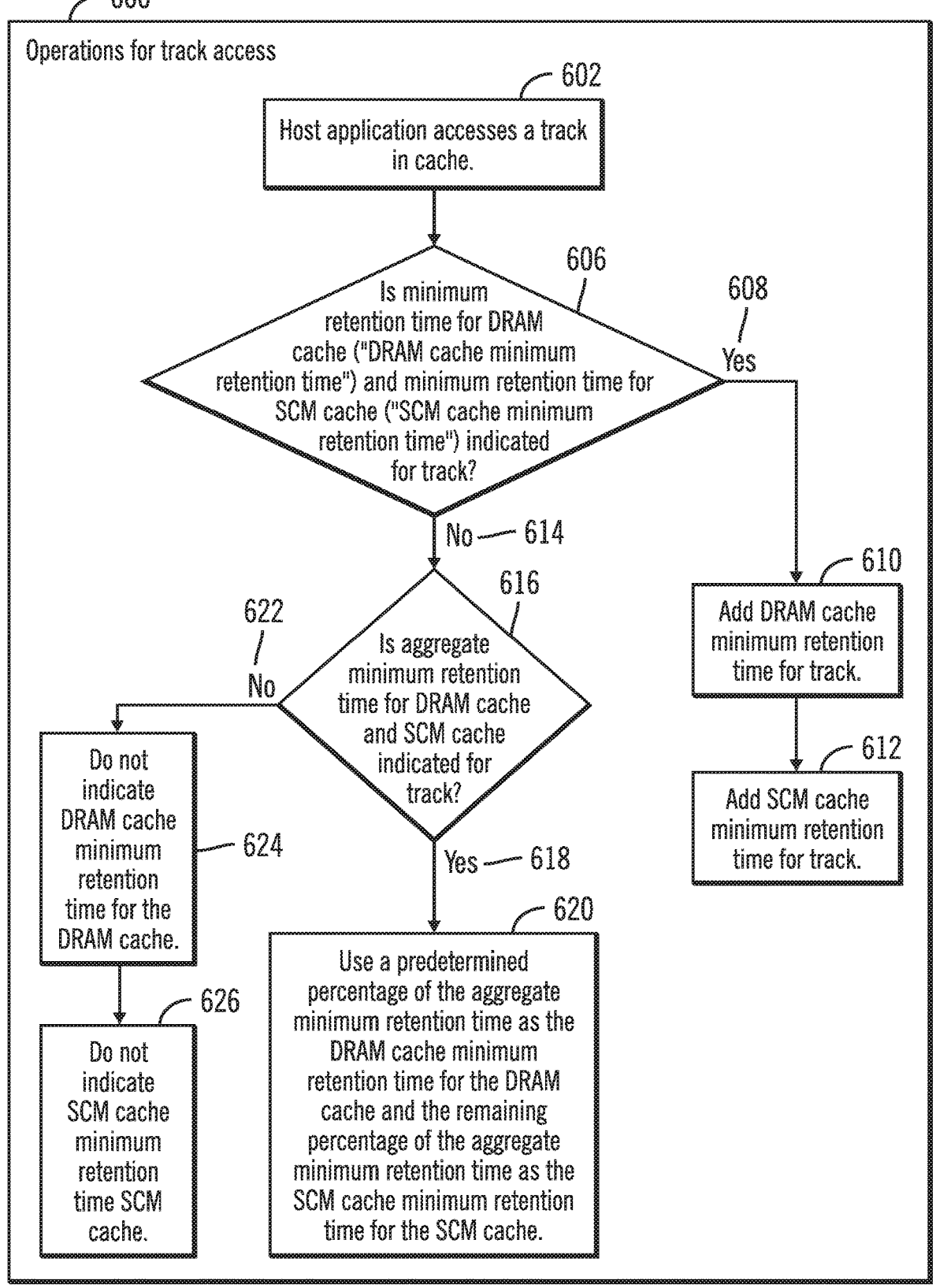
FIG. 6 illustrates a flowchart that shows operations for track access, in accordance with certain embodiments.

FIG. 6 illustrates a flowchart 600 that shows operations for track access, in accordance with certain embodiments.

Control starts at block 604 in which the host application accesses a track in the two-tier cache. A determination is made at block 604 as to whether the minimum retention time for DRAM cache ("DRAM cache minimum retention time") and minimum retention time for SCM cache ("SCM cache minimum retention time") is indicated for the track by the host application. If so ("Yes" branch 608) the DRAM cache minimum retention time and the SCM cache minimum retention time are associated with the track by the cache management application 116 (at blocks 610, 612).

If DRAM cache minimum retention time and the SCM cache minimum retention time are not indicated for the track by the host application ("No" branch 614) then control proceeds to block 616 in which a determination is made as to whether aggregate minimum retention time for DRAM cache and SCM cache is indicated for the track. If so ("Yes" branch 618) control proceeds to block 620 in which the cache management application uses a predetermined percentage of the aggregate minimum retention time as the DRAM cache minimum retention time for the track for the DRAM cache and the remaining percentage of the aggregate minimum retention time as the SCM cache minimum retention time for the track for the SCM cache.

If the aggregate minimum retention time for DRAM cache and SCM cache is not indicated for the track ("No" branch 622), then the DRAM cache minimum retention time and the SCM cache minimum retention time are not indicated for the tracks (blocks 624, 626).

Figure 7:
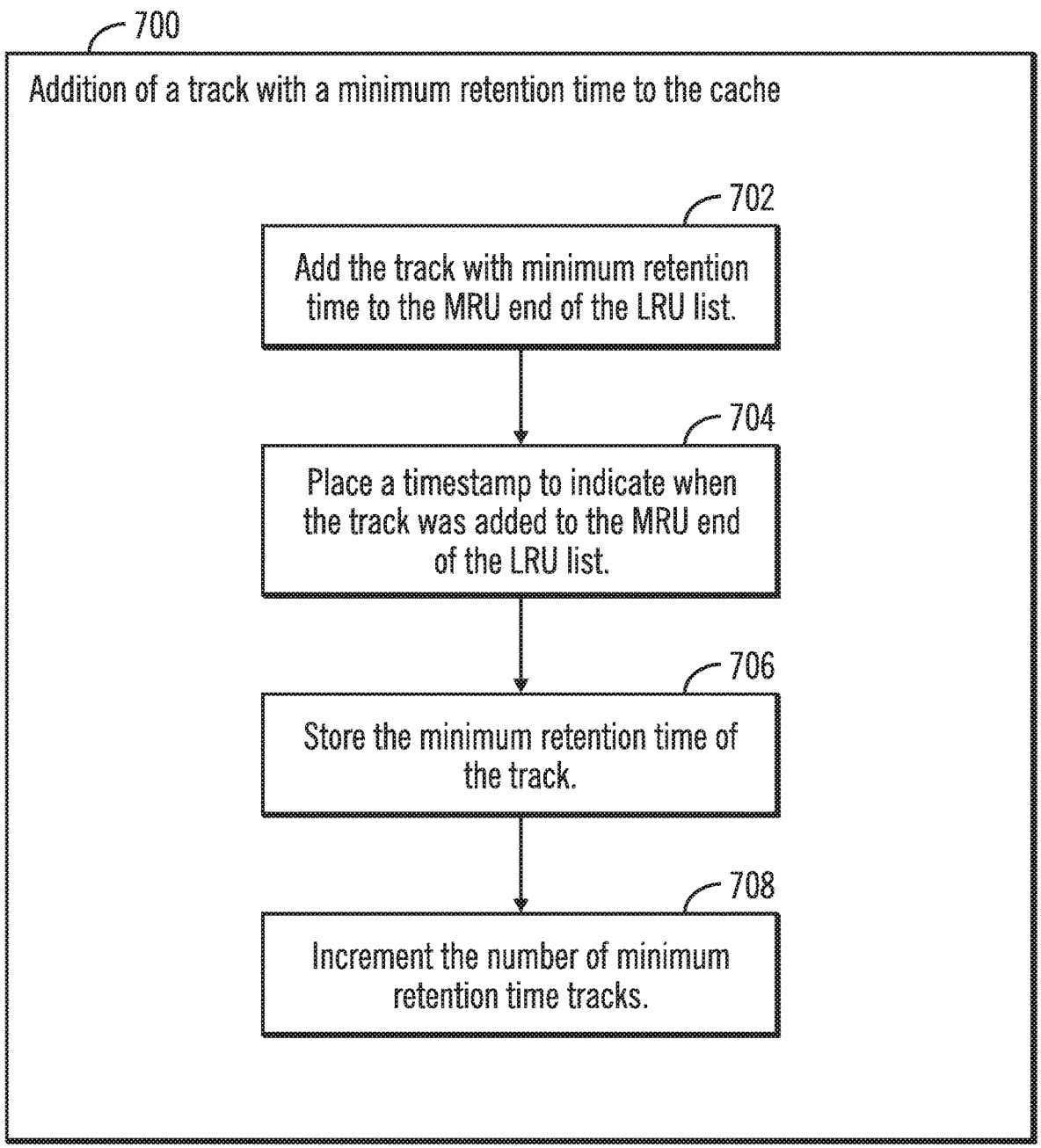
FIG. 7 illustrates a block diagram that shows addition of a track with a minimum retention time to the cache, in accordance with certain embodiments.

FIG. 7 illustrates a block diagram that shows addition of a track with a minimum retention time to the two-tier cache 104, in accordance with certain embodiments. The operations shown in FIG. 7 may be performed by the cache management application 116 that executes in the storage controller 102. The operations shown in FIG. 7 improves the performance of the storage controller 102 by preventing potential cache misses should there be indications of minimum retention time for certain tracks in the two-tier cache 104.

Control starts at block 702 in which the cache management application 116 adds the track with minimum retention time to the MRU end of the LRU list 118 for any tier of cache. Control proceeds to block 704 in which the cache management application 116 places a timestamp to indicate when the track was added to the MRU end of the LRU list 118. The timestamp is kept in association with the track that is added to the LRU list 118

From block 704 control proceeds to block 706 in which the cache management application 116 stores the minimum retention time of the track in association with the track that is added to the LRU list 118. The cache management application 116 then increments (i.e., adds the number 1) to the number of minimum retention time tracks (as shown via block 708).

Therefore, FIG. 7 shows certain embodiments in which tracks are added to the LRU list 118 of any tier of cache with indication of the minimum retention time and a timestamp that records the time at which the track was added to the LRU list. The number of tracks with minimum retention time is updated when a track with a minimum retention time is added to the LRU list 118. It should be noted that the corresponding LRU list 118 is updated each time a track is added to a tier of the cache 104.

Figure 8:
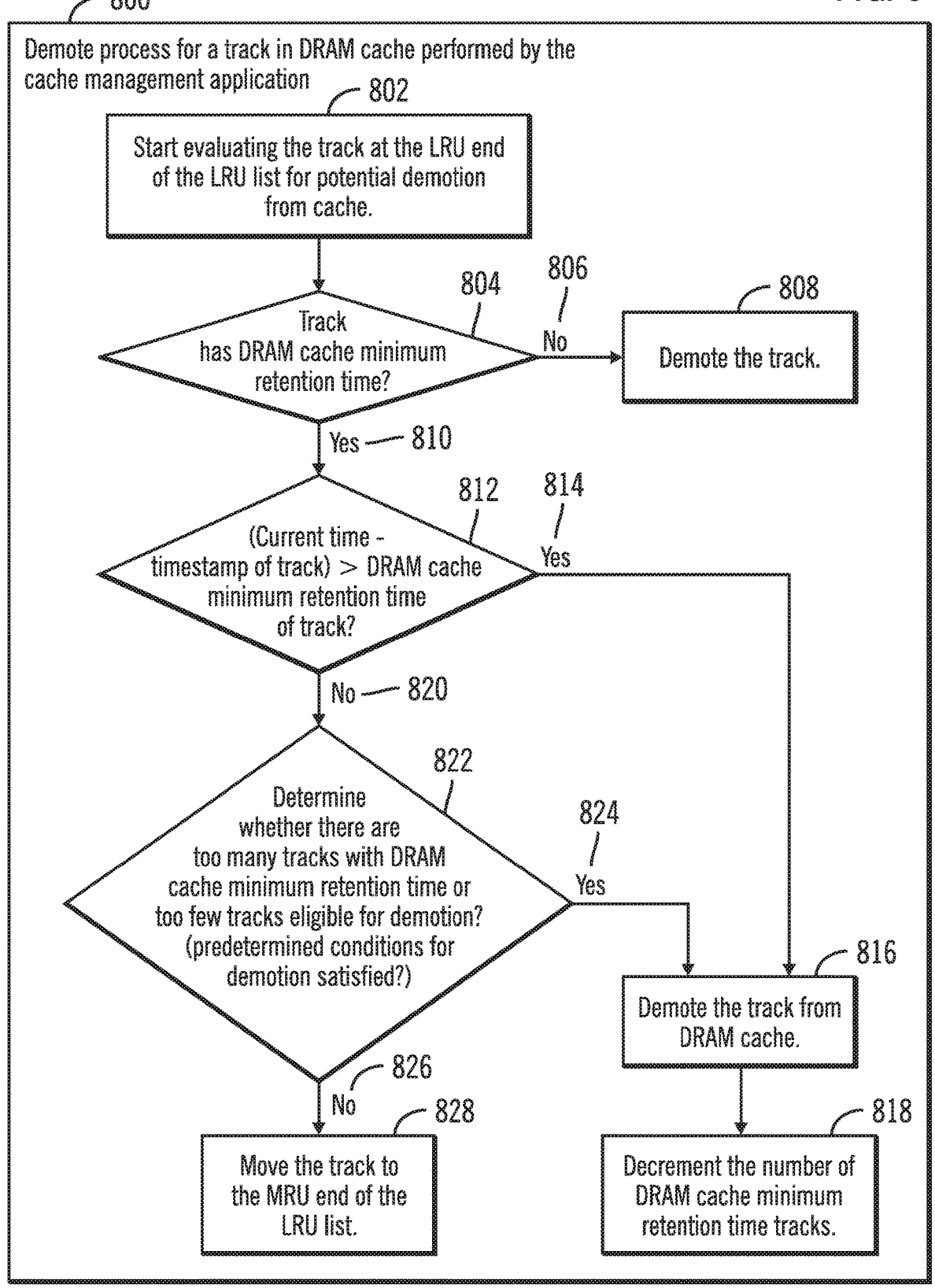
FIG. 8 illustrates a flowchart that shows the demote process for a track in the DRAM cache as performed by a cache management application, in accordance with certain embodiments.

FIG. 8 illustrates a flowchart that shows the demote process for a track in the DRAM cache 112 as performed by a cache management application 116, in accordance with certain embodiments. The operations shown in FIG. 8 improve the performance of the storage controller 102 by reducing cache misses should there be indications of minimum retention time for certain tracks in the DRAM cache 112.

Control starts at block 802 in which the cache management application 116 starts evaluating the track at the LRU end of the LRU list 118 for potential demotion from the DRAM cache 112. Control proceeds to block 804 in which the cache management application 116 determines whether the track has a minimum retention time. If not ("No" branch 806), then the cache management application 116 demotes (at block 808) the track from the DRAM cache 112.

If at block 804 the cache management application 116 determines that the track has a minimum retention time ("Yes" branch 810) then control proceeds to block 812 in which the cache management application 116 determines whether the difference of the current time from the timestamp of the track is greater than the minimum retention time of the track (i.e., whether the track has been in the DRAM cache for a time that exceeds the minimum retention time). If so ("Yes" branch 814) then the track is demoted (at block 816) and the cache management application 116 decrements (i.e., subtracts the number 1) the number of minimum retention time tracks in the DRAM cache 112 (at block 818).

If at block 812 it is determined that the difference of the current time 138 from the timestamp of the track is not greater than the minimum retention time of the track (i.e., the track has not been in the DRAM cache for a time that exceeds the minimum retention time) ["No" branch 820] control proceeds to block 822 to determine whether the track should be demoted to prevent the DRAM cache 112 from becoming full.

At block 822 the cache management application 116 determines whether there are too many tracks with minimum retention time or too few tracks that are eligible for demotion from the cache that may cause the cache to become full. What is "too many" and what is "too few" is determined based on certain predetermined conditions, where some exemplary predetermined conditions are described later.

If at block 822 the cache management application 116 determines that there are too many tracks with minimum retention time or too few tracks that are eligible for demotion from the DRAM cache that may cause the DRAM cache to become full ("Yes" branch 824) then control proceeds to block 816 in which the track is demoted and the number of minimum retention time tracks is decremented (at block 818).

If at block 822 the cache management application 116 determines that that neither are there too many tracks with minimum retention time nor are there too few tracks that are eligible for demotion from the DRAM cache that may cause the DRAM cache to become full ("No" branch 826) then there is no danger of the DRAM cache 112 becoming full and the cache management application 116 moves (at block 828) the track to the MRU end of the LRU list 118 (i.e., the track is retained in the DRAM cache 112 and moved to the MRU end of the LRU list 118).

Therefore, FIG. 8 illustrates certain embodiments in which tracks that are indicated as having a minimum retention time are preferred for storing in the DRAM cache at least till the expiry of the minimum retention time unless the DRAM cache 112 is in danger of becoming full.

Figure 9:
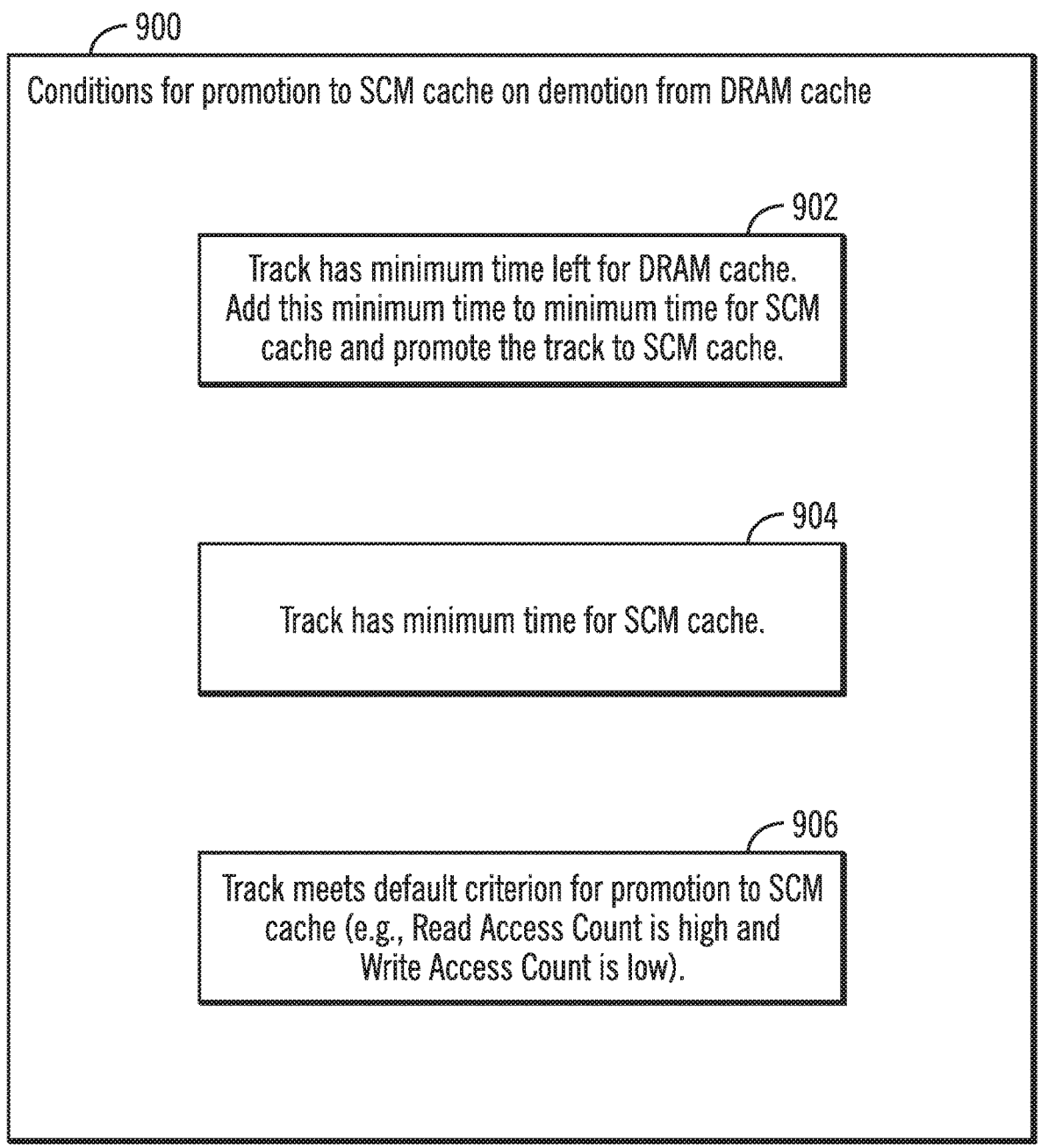
FIG. 9 illustrates a block diagram that shows condition for promotion to SCM cache on demotion from DRAM cache, in accordance with certain embodiments.

FIG. 9 illustrates a block diagram 900 that shows condition for promotion (i.e., addition) to SCM cache 114 on demotion from DRAM cache 112 of track, in accordance with certain embodiments. When a track is demoted from the DRAM cache, the track can be promoted to SCM cache if any of the following conditions apply:

(i) Track has minimum time left for DRAM cache. Then this minimum time is added to the minimum time for SCM cache and the track is promoted to SCM cache (reference numeral 802):

(ii) Track has minimum time for SCM cache (reference numeral 904):

(iii) Track meets default criterion for promotion to SCM cache [e.g., A Read Access Count is high and a Write Access Count is low, i.e., a lot of read accesses and few write accesses of the track are taking place in the DRAM cache] (reference numeral 906).

Figure 10:
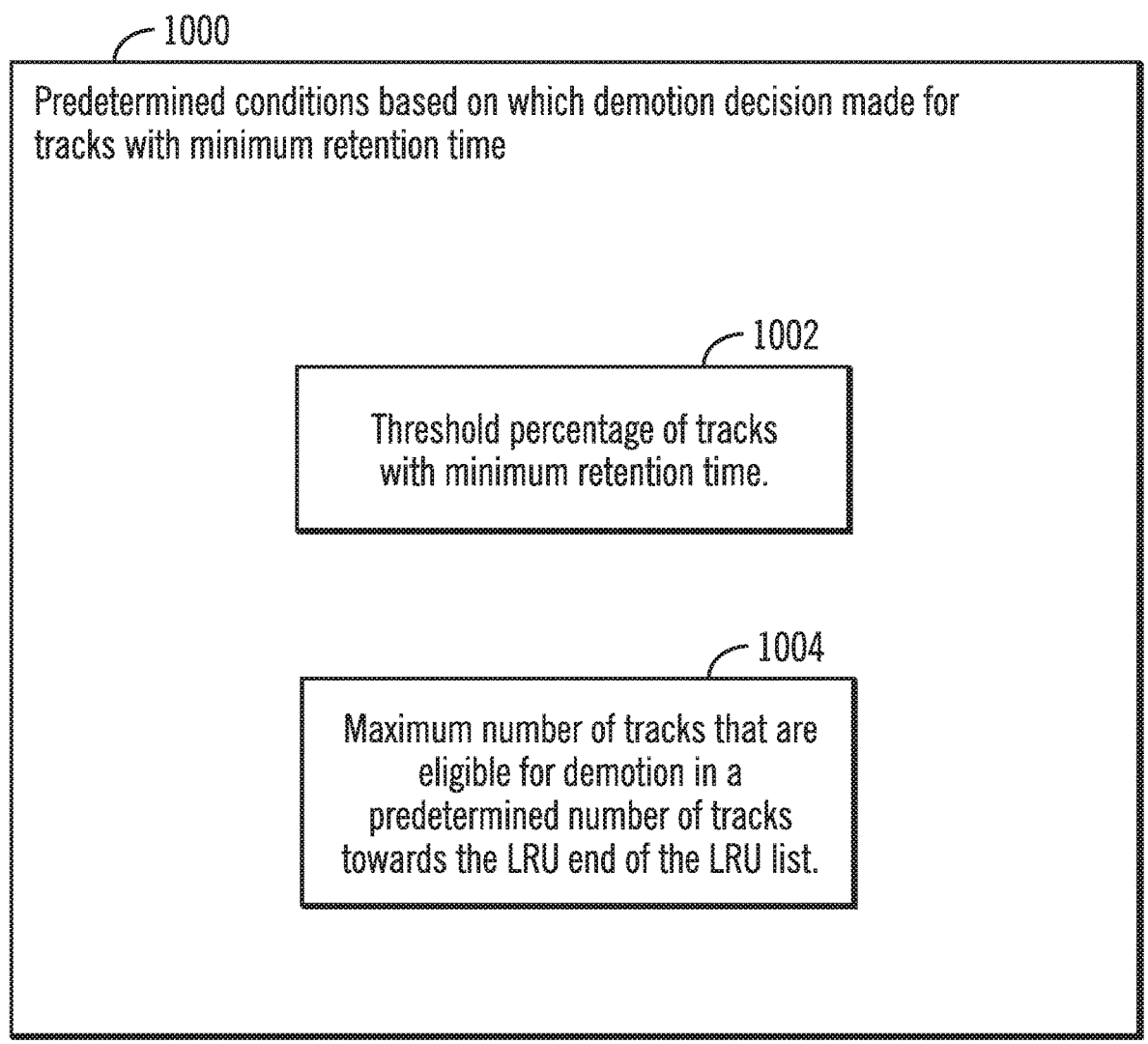
FIG. 10 illustrates a block diagram that shows predetermined conditions based on which a demotion decision for a track with minimum retention time is made, in accordance with certain embodiments.

FIG. 10 illustrates a block diagram 1000 that shows predetermined conditions based on which a demotion decision for a track with minimum retention time is made of tracks in the DRAM or SCM cache, in accordance with certain embodiments.

A threshold indicating the percentage of tracks with minimum retention time above which tracks with minimum retention time are eligible for demotion is maintained (as shown via reference numeral 1002) in the storage controller 102. For example, in certain embodiments the threshold may be 50%, and as a result more if more than 50% of the tracks in the cache are tracks with minimum retention time, then one or more tracks with minimum retention time may be demoted/

A "maximum number" of tracks that are eligible for demotion in a "predetermined number" of tracks towards the LRU end of the LRU list 118 is maintained (as shown via reference numeral 1004) in the storage controller 102. For example, if the cache management application 116 scans N tracks from the bottom of the LRU (i.e., the N least recently used tracks, where N is a number) and finds less than M tracks eligible to demote because of minimum retention time requirements, then tracks with a minimum retention time may be demoted (i.e., M is the maximum number and N is the "predetermined number"). For example, if the cache management application 116 scans 1000 tracks from the bottom of LRU (i.e., the 1000 least recently used tracks) to demote and only finds less than 100 as being eligible for demotion then tracks with minimum retention time may be demoted.

Figure 11:
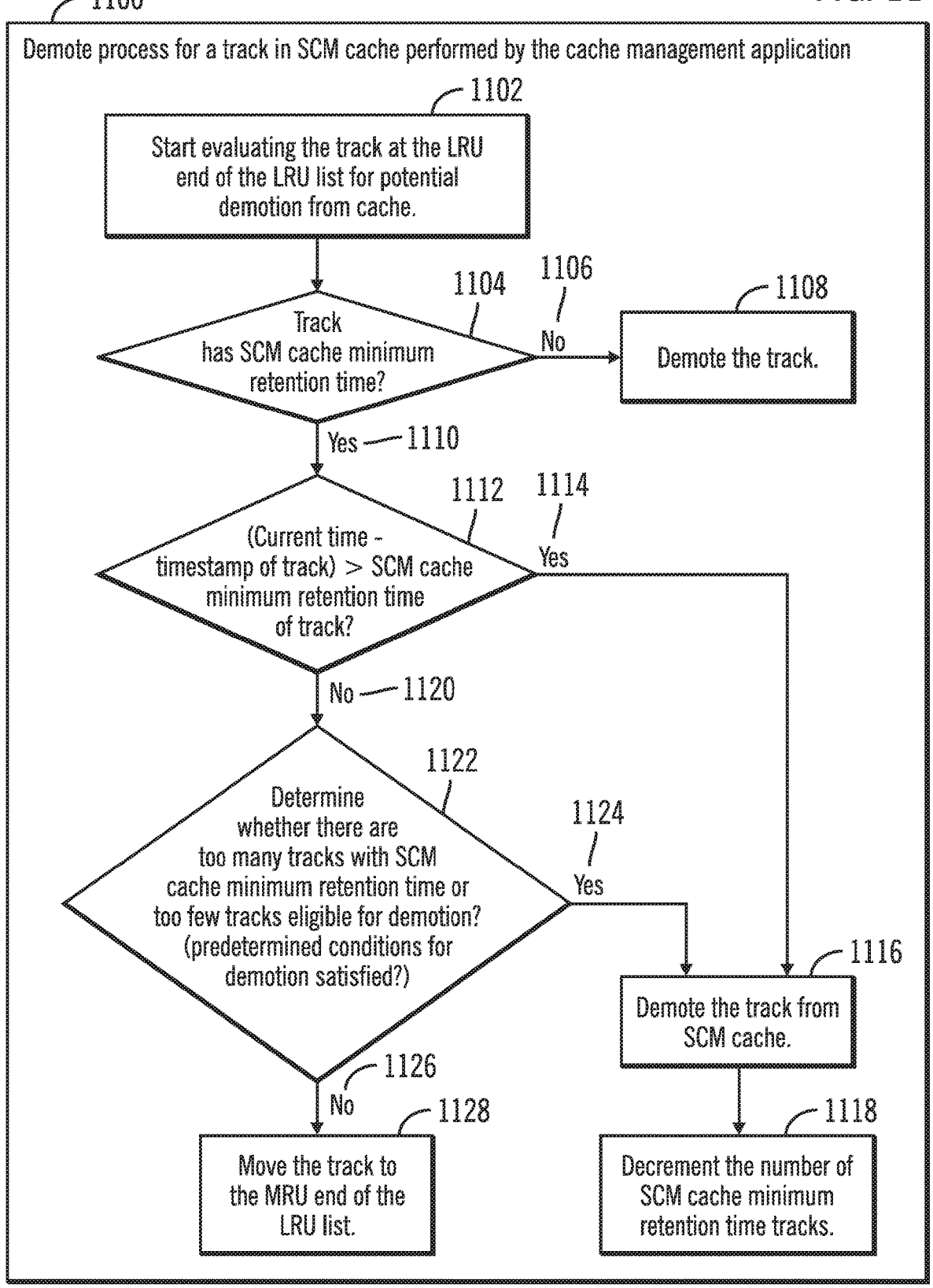
FIG. 11 illustrates a flowchart that shows the demote process for a track in the SCM cache as performed by the cache management application, in accordance with certain embodiments.

FIG. 11 illustrates a flowchat 1100 that shows the demote process for a track in the SCM cache as performed by the cache management application, in accordance with certain embodiments. The operations shown in FIG. 11 improves the performance of the storage controller 102 by reducing cache misses should there be indications of minimum retention time for certain tracks in the SCM cache 114.

Control starts at block 1102 in which the cache management application 116 starts evaluating the track at the LRU end of the LRU list 118 for potential demotion from the SCM cache 114. Control proceeds to block 1104 in which the cache management application 116 determines whether the track has a minimum retention time. If not ("No" branch 1106), then the cache management application 116 demotes (at block 1108) the track from the SCM cache 114.

If at block 1104 the cache management application 116 determines that the track has a minimum retention time ("Yes" branch 1110) then control proceeds to block 1112 in which the cache management application 116 determines whether the difference of the current time from the timestamp of the track is greater than the minimum retention time of the track (i.e., whether the track has been in the SCM cache for a time that exceeds the minimum retention time). If so ("Yes" branch 1114) then the track is demoted (at block 1116) and the cache management application 116 decrements (i.e., subtracts the number 1) the number of minimum retention time tracks in the SCM cache 114 (at block 1118).

If at block 1112 it is determined that the difference of the current time 138 from the timestamp of the track is not greater than the minimum retention time of the track (i.e., the track has not been in the SCM cache for a time that exceeds the minimum retention time) ["No" branch 1120] control proceeds to block 1122 to determine whether the track should be demoted to prevent the SCM cache 114 from becoming full.

At block 1122 the cache management application 116 determines whether there are too many tracks with minimum retention time or too few tracks that are eligible for demotion from the cache that may cause the cache to become full. What is "too many" and what is "too few" is determined based on certain predetermined conditions, where some exemplary predetermined conditions are described later.

If at block 1122 the cache management application 116 determines that there are too many tracks with minimum retention time or too few tracks that are eligible for demotion from the SCM cache that may cause the SCM cache to become full ("Yes" branch 1124) then control proceeds to block 1116 in which the track is demoted and the number of minimum retention time tracks is decremented (at block 1118).

If at block 1122 the cache management application 116 determines that that neither are there too many tracks with minimum retention time nor are there too few tracks that are eligible for demotion from the SCM cache that may cause the SCM cache to become full ("No" branch 1126) then there is no danger of the SCM cache 114 becoming full and the cache management application 116 moves (at block 1128) the track to the MRU end of the LRU list 118 (i.e., the track is retained in the SCM cache 114 and moved to the MRU end of the LRU list 118).

Therefore, FIG. 11 illustrates certain embodiments in which tracks that are indicated as having a minimum retention time are preferred for storing in the SCM cache at least till the expiry of the minimum retention time unless the SCM cache 114 is in danger of becoming full.

Figure 12:
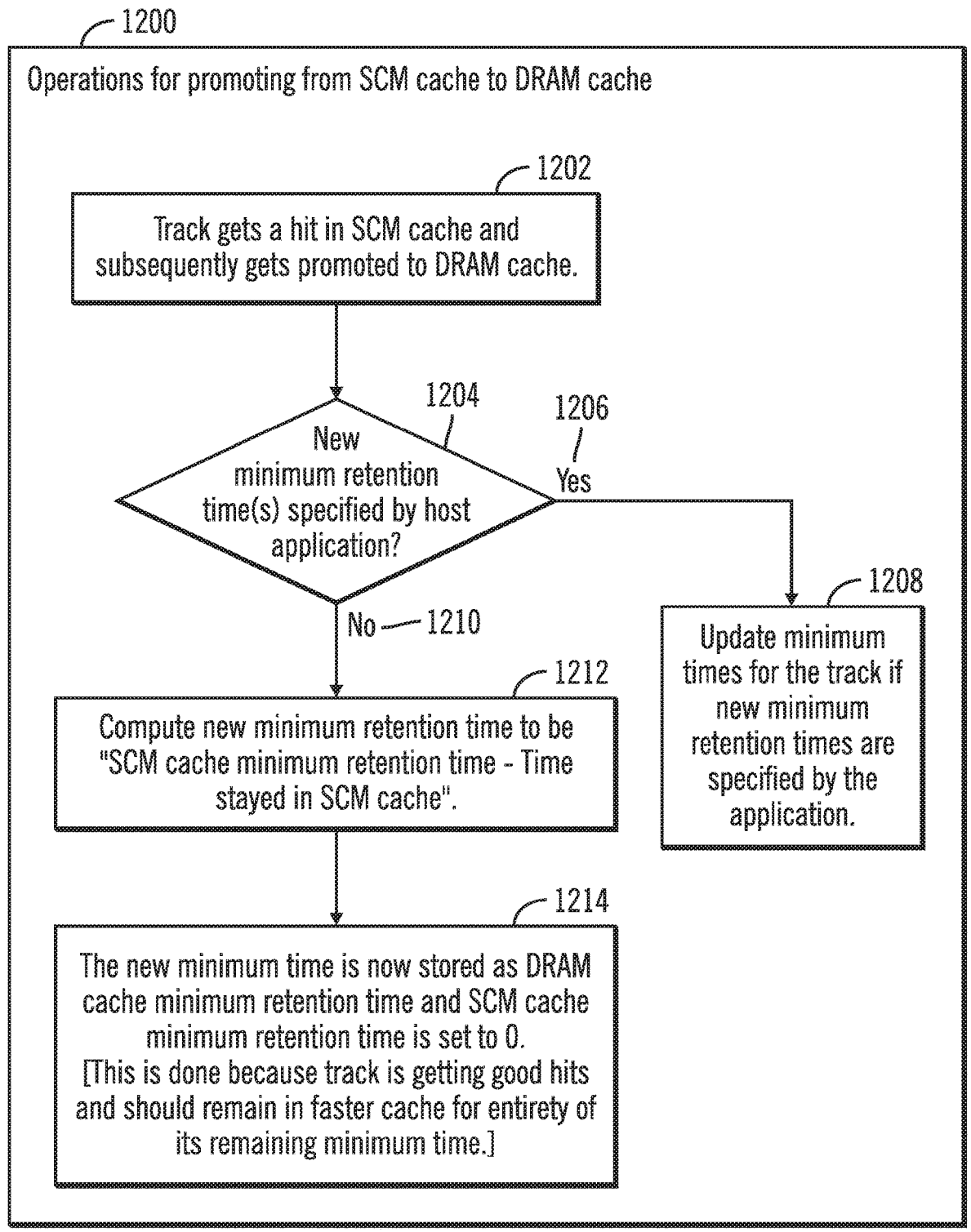
FIG. 12 illustrates a flowchart that shows operations for promotion from SCM cache to DRAM cache, in accordance with certain embodiments.

FIG. 12 illustrates a flowchart 1200 that shows operations for promotion from SCM cache to DRAM cache, in accordance with certain embodiments.

If track gets a hit in SCM cache and subsequently promoted to DRAM cache (at block 1202) then determination is made (at block 1204) as to whether new minimum retention times have been specified by the host application for the track for the DRAM cache. If so ("Yes" branch 1206), then the cache management application 116 updates (at block 1208) the minimum retention times for the track. If not ("No" branch 1210), then the cache management application 116 computes new remaining minimum time based on the calculation "SCM minimum time—Time stayed in SCM cache" (reference numeral 1212). This new minimum time is now stored as DRAM minimum retention time and SCM minimum retention time is set to 0. This is done because the track is getting good hits and should remain in faster cache (i.e., the DRAM cache) for the entirety of its remaining minimum retention time.

Figure 13:
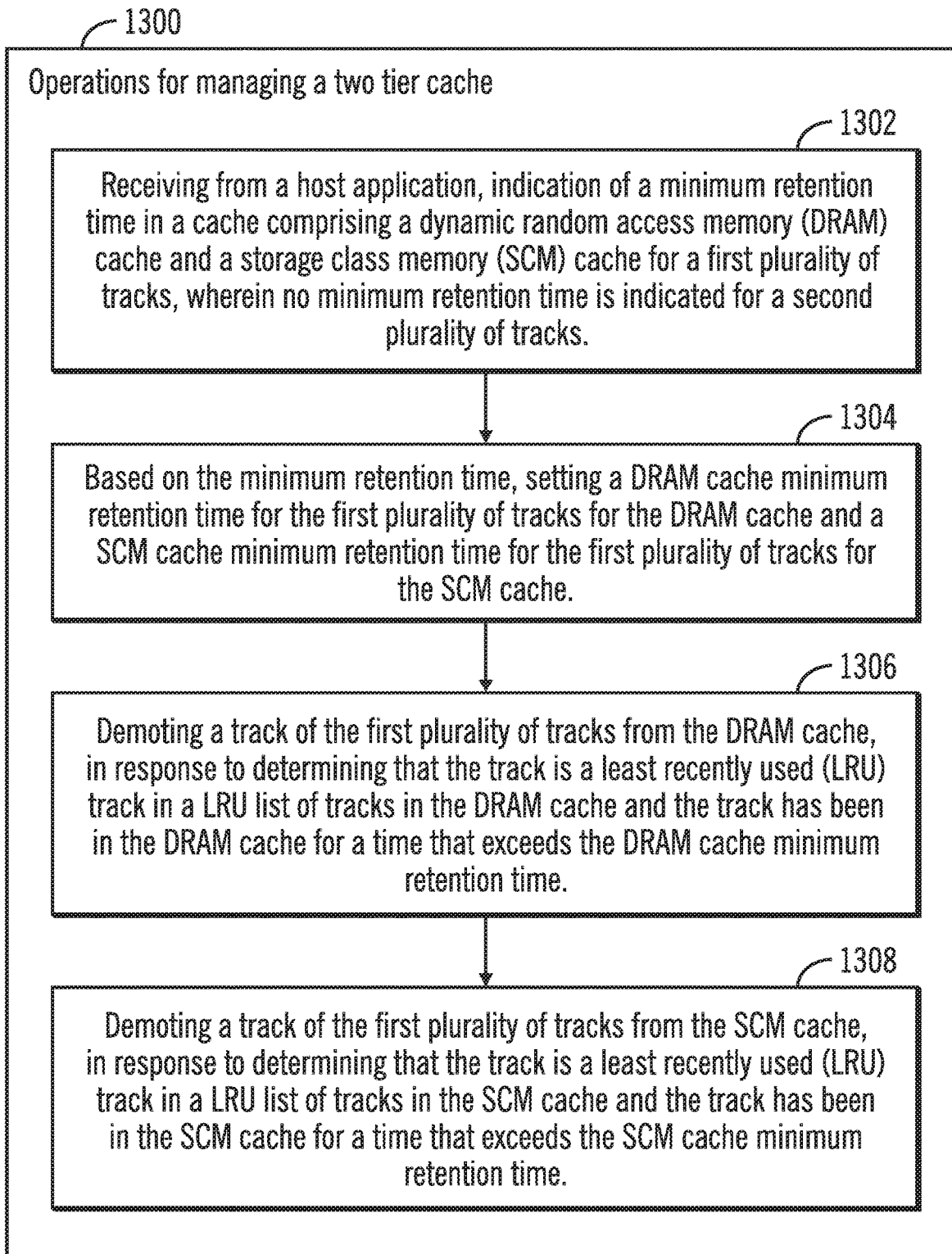
FIG. 13 illustrates a flowchart that shows operations for managing a two-tier cache, in accordance with certain embodiments.

FIG. 13 illustrates a flowchart 1300 that shows operations for managing a two-tier cache as performed by the cache management application 116, in accordance with certain embodiments.

Control starts at block 1302 in which an indication is received from a host application 120 of a minimum retention time (may be referred to as a first minimum retention time) in a cache 104 comprising a dynamic random access memory (DRAM) cache 112 and a storage class memory (SCM) cache 114 for a first plurality of tracks, wherein no minimum retention time is indicated for a second plurality of tracks. Based on the minimum retention time, a DRAM cache minimum retention time (may be referred to as a second minimum retention time) is set for the first plurality of tracks for the DRAM cache and a SCM cache minimum retention time (may be referred to as a third minimum retention time) is set for the first plurality of tracks for the SCM cache (at block 1304).

From block 1304 control proceeds to block 1306 in which a track of the first plurality of tracks is demoted from the DRAM cache, in response to determining that the track is a least recently used (LRU) track in a LRU list of tracks in the DRAM cache and the track has been in the DRAM cache for a time that exceeds the DRAM cache minimum retention time.

From block 1306 control proceeds to block 1308 in which the cache management application 116 demotes a track of the first plurality of tracks from the SCM cache, in response to determining that the track is a least recently used (LRU) track in a LRU list of tracks in the SCM cache and the track has been in the SCM cache for a time that exceeds the SCM cache minimum retention time.

Therefore FIGS. 1-13 illustrate certain embodiments for managing a two-tier cache with the higher tier being a DRAM cache and a lower tier being a SCM cache by integrating minimum retention times of tracks provided by a host application to a cache management application of a storage controller.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 14:
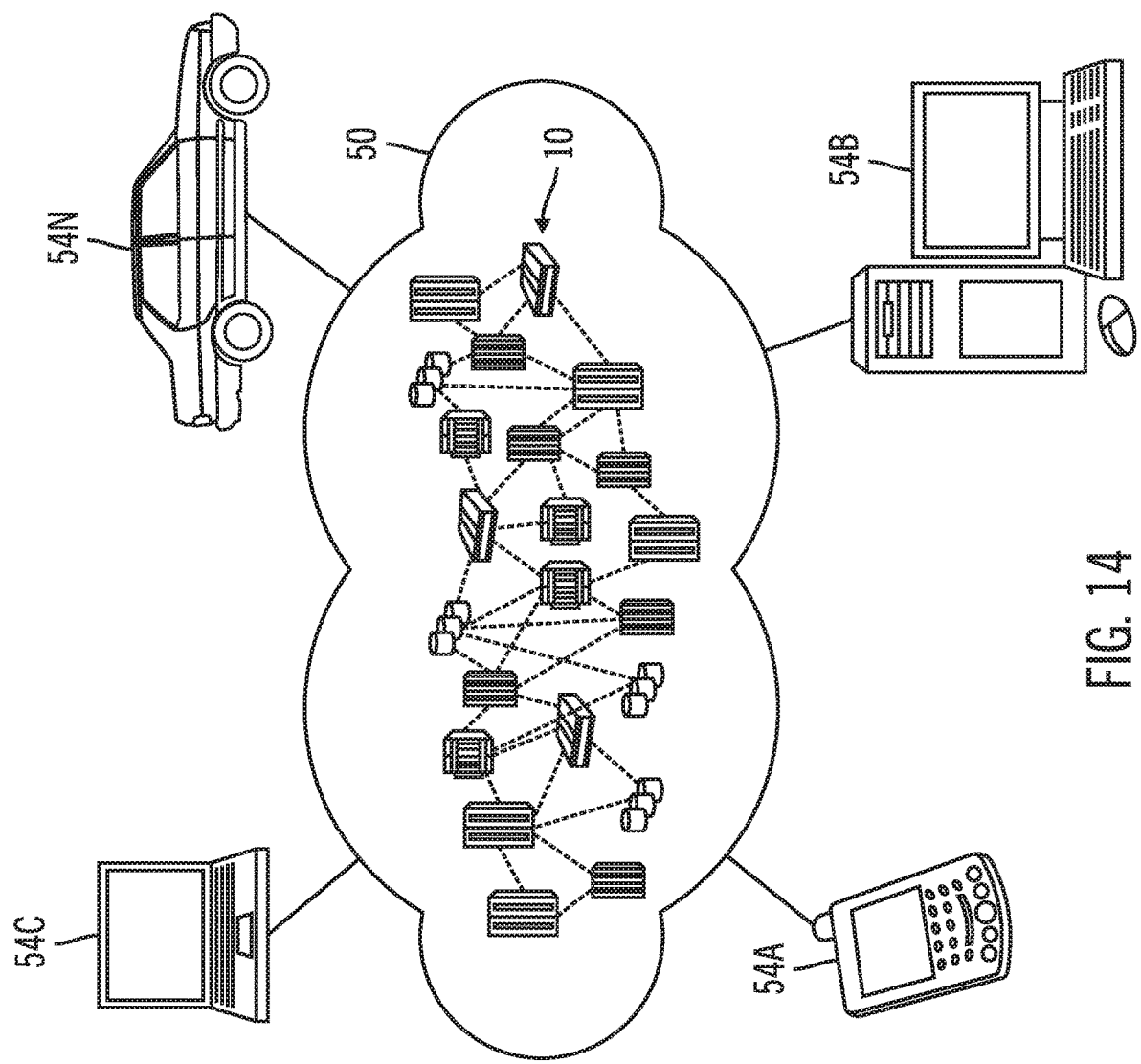
FIG. 14 illustrates a block diagram of a cloud computing environment, in accordance with certain embodiments.

Referring now to FIG. 14 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
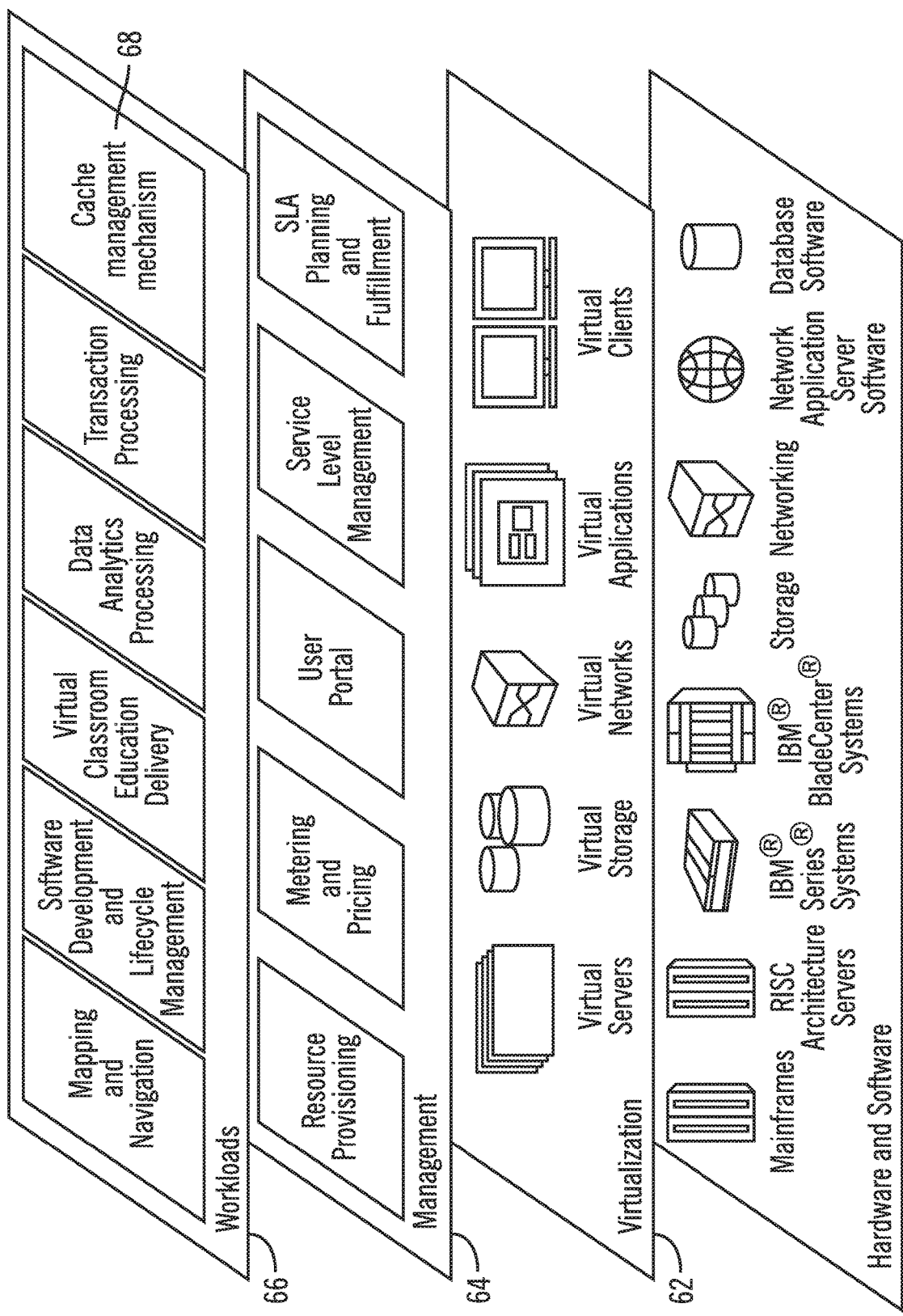
FIG. 15 illustrates a block diagram of further details of the cloud computing environment of FIG. 14, in accordance with certain embodiments.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided; virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cache management mechanism 68 as shown in FIGS. 1-15.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 16:
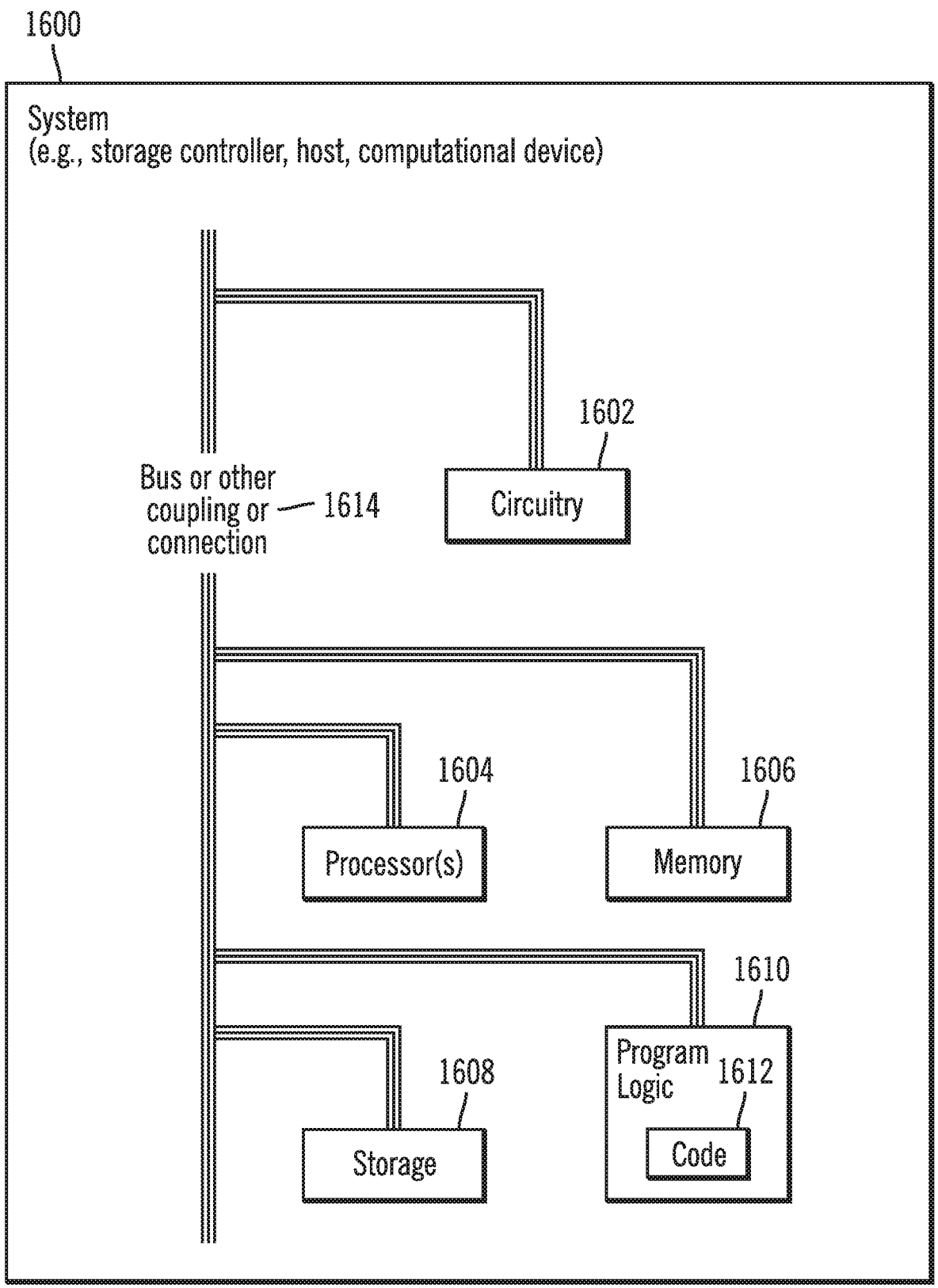
FIG. 16 illustrates a block diagram of a computational system that shows certain elements that may be included in the storage controller or the host, as described in FIGS. 1-15, in accordance with certain embodiments.

FIG. 16 illustrates a block diagram that shows certain elements that may be included in the storage controller 102 or the host 106, or other computational devices in accordance with certain embodiments. The system 1600 may include a circuitry 1602 that may in certain embodiments include at least a processor 1604. The system 1600 may also include a memory 1606 (e.g., a volatile memory device), and storage 1608. The storage 1608 may include a non-volatile memory device (e.g., EEPROM, ROM, PROM, flash, firmware, programmable logic, etc.), magnetic disk drive, optical disk drive, tape drive, etc. The storage 1608 may comprise an internal storage device, an attached storage device and/or a network accessible storage device. The system 1600 may include a program logic 1610 including code 1612 that may be loaded into the memory 1606 and executed by the processor 1604 or circuitry 1602. In certain embodiments, the program logic 1610 including code 1612 may be stored in the storage 1608. In certain other embodiments, the program logic 1610 may be implemented in the circuitry 1602. One or more of the components in the system 1600 may communicate via a bus or via other coupling or connection 1614. Therefore, while FIG. 16 shows the program logic 1610 separately from the other elements, the program logic 1610 may be implemented in the memory 1606 and/or the circuitry 1602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a". "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    receiving from a host application, an indication of a first minimum retention time in a cache comprising a first type of memory and a second type of memory for a first plurality of tracks, wherein the first minimum retention time is not indicated for a second plurality of tracks;
    based on the first minimum retention time, setting a second minimum retention time for the first plurality of tracks for the first type of memory and a third minimum retention time for the first plurality of tracks for the second type of memory; and
    demoting a track of the first plurality of tracks from the first type of memory, in response to determining that the track is a least recently used (LRU) track in a LRU list of tracks in the first type of memory and the track has been in the first type of memory for a time that exceeds the second minimum retention time.

2. The method of claim 1, wherein the first type of memory is a dynamic random access memory (DRAM) cache and the second type of memory is a storage class memory (SCM) cache, and wherein the second minimum retention time is a DRAM cache minimum retention time and the third minimum retention time is a SCM cache minimum retention time.

3. The method of claim 2, the method further comprising:
    demoting, by a cache management application, a track of the first plurality of tracks from the SCM cache, in response to determining that the track is a least recently used (LRU) track in a LRU list of tracks in the SCM cache and the track has been in the SCM cache for a time that exceeds the SCM cache minimum retention time.

4. The method of claim 2, wherein the indication of the first minimum retention time in cache comprises an individual minimum retention time for the DRAM cache and an individual minimum retention time for the SCM cache, wherein the DRAM cache minimum retention time is set to the individual minimum retention time for the DRAM cache, and wherein the SCM cache minimum retention time is set to the individual minimum retention time for the SCM cache.

5. The method of claim 2, wherein the indication of the first minimum retention time in cache comprises an aggregate minimum retention time for the DRAM cache and the SCM cache, wherein the DRAM cache minimum retention time is set to a predetermined percentage of the aggregate minimum retention time, and wherein the SCM cache minimum retention time is set to a remaining percentage of the aggregate minimum retention time.

6. The method of claim 2, wherein while promoting a track securing more than a predetermined number of hits from the SCM cache to the DRAM cache, unless a new first minimum retention time is provided for the track by the host application, a cache management application sets the DRAM cache minimum retention time to a difference of the SCM cache minimum retention time and the time the track has spent in the SCM cache prior to being promoted to the DRAM cache.

7. The method of claim 2, wherein promoting a track from the DRAM cache to SCM cache comprises adding an unutilized time for the track in the DRAM cache to the SCM cache minimum retention time, wherein the DRAM cache has a lower latency and a lower storage capacity than the SCM cache, and wherein the DRAM cache and the SCM cache form a two-tier cache with the DRAM cache being a higher tier and the SCM cache being a lower tier, and wherein for the second plurality of tracks a cache management application does not set the DRAM cache minimum retention time and the SCM cache minimum retention time.

8. A system, comprising:
    a memory; and
    a processor coupled to the memory, wherein the processor performs operations, the operations performed by the processor comprising:
    receiving from a host application, an indication of a first minimum retention time in a cache comprising a first type of memory and a second type of memory for a first plurality of tracks, wherein the first minimum retention time is not indicated for a second plurality of tracks;
    based on the first minimum retention time, setting a second minimum retention time for the first plurality of tracks for the first type of memory and a third minimum retention time for the first plurality of tracks for the second type of memory; and demoting a track of the first plurality of tracks from the first type of memory, in response to determining that the track is a least recently used (LRU) track in a LRU list of tracks in the first type of memory and the track has been in the first type of memory for a time that exceeds the second minimum retention time.

9. The system of claim 8, wherein the first type of memory is a dynamic random access memory (DRAM) cache and the second type of memory is a storage class memory (SCM) cache, and wherein the second minimum retention time is a DRAM cache minimum retention time and the third minimum retention time is a SCM cache minimum retention time.

10. The system of claim 9, the operations further comprising:
demoting, by a cache management application, a track of the first plurality of tracks from the SCM cache, in response to determining that the track is a least recently used (LRU) track in a LRU list of tracks in the SCM cache and the track has been in the SCM cache for a time that exceeds the SCM cache minimum retention time.

11. The system of claim 9, wherein the indication of the first minimum retention time in cache comprises an individual minimum retention time for the DRAM cache and an individual minimum retention time for the SCM cache, wherein the DRAM cache minimum retention time is set to the individual minimum retention time for the DRAM cache, and wherein the SCM cache minimum retention time is set to the individual minimum retention time for the SCM cache.

12. The system of claim 9, wherein the indication of the first minimum retention time in cache comprises an aggregate minimum retention time for the DRAM cache and the SCM cache, wherein the DRAM cache minimum retention time is set to a predetermined percentage of the aggregate minimum retention time, and wherein the SCM cache minimum retention time is set to a remaining percentage of the aggregate minimum retention time.

13. The system of claim 9, wherein while promoting a track securing more than a predetermined number of hits from the SCM cache to the DRAM cache, unless a new first minimum retention time is provided for the track by the host application, a cache management application sets the DRAM cache minimum retention time to a difference of the SCM cache minimum retention time and the time the track has spent in the SCM cache prior to being promoted to the DRAM cache.

14. The system of claim 9, wherein promoting a track from the DRAM cache to SCM cache comprises adding an unutilized time for the track in the DRAM cache to the SCM cache minimum retention time, wherein the DRAM cache has a lower latency and a lower storage capacity than the SCM cache, and wherein the DRAM cache and the SCM cache form a two-tier cache with the DRAM cache being a higher tier and the SCM cache being a lower tier, and wherein for the second plurality of tracks a cache management application does not set the DRAM cache minimum retention time and the SCM cache minimum retention time.

15. A computer program product, the computer program product comprising a computer readable storage medium having computer readable program code embodied therewith, the computer readable program code configured to perform operations, the operations comprising:
receiving from a host application, an indication of a first minimum retention time in a cache comprising a first type of memory and a second type of memory for a first plurality of tracks, wherein the first minimum retention time is not indicated for a second plurality of tracks;
based on the first minimum retention time, setting a second minimum retention time for the first plurality of tracks for the first type of memory and a third minimum retention time for the first plurality of tracks for the second type of memory; and
demoting a track of the first plurality of tracks from the first type of memory, in response to determining that the track is a least recently used (LRU) track in a LRU list of tracks in the first type of memory and the track has been in the first type of memory for a time that exceeds the second minimum retention time.

16. The computer program product of claim 15, wherein the first type of memory is a dynamic random access memory (DRAM) cache and the second type of memory is a storage class memory (SCM) cache, and wherein the second minimum retention time is a DRAM cache minimum retention time and the third minimum retention time is a SCM cache minimum retention time.

17. The computer program product of claim 16, the operations further comprising:
demoting, by a cache management application, a track of the first plurality of tracks from the SCM cache, in response to determining that the track is a least recently used (LRU) track in a LRU list of tracks in the SCM cache and the track has been in the SCM cache for a time that exceeds the SCM cache minimum retention time.

18. The computer program product of claim 16, wherein the indication of the first minimum retention time in cache comprises an individual minimum retention time for the DRAM cache and an individual minimum retention time for the SCM cache, wherein the DRAM cache minimum retention time is set to the individual minimum retention time for the DRAM cache, and wherein the SCM cache minimum retention time is set to the individual minimum retention time for the SCM cache.

19. The computer program product of claim 16, wherein the indication of the first minimum retention time in cache comprises an aggregate minimum retention time for the DRAM cache and the SCM cache, wherein the DRAM cache minimum retention time is set to a predetermined percentage of the aggregate minimum retention time, and wherein the SCM cache minimum retention time is set to a remaining percentage of the aggregate minimum retention time.

20. The computer program product of claim 16, wherein while promoting a track securing more than a predetermined number of hits from the SCM cache to the DRAM cache, unless a new first minimum retention time is provided for the track by the host application, a cache management application sets the DRAM cache minimum retention time to a difference of the SCM cache minimum retention time and the time the track has spent in the SCM cache prior to being promoted to the DRAM cache.

* * * * *